United States Patent [19]

Hamilton

[11] Patent Number: 4,519,673
[45] Date of Patent: May 28, 1985

[54] OPTICAL WAVEGUIDE SLIP RING ASSEMBLY

[75] Inventor: James G. Hamilton, Glasgow, Scotland

[73] Assignee: Barr & Stroud Limited, Glasgow, Scotland

[21] Appl. No.: 482,971

[22] Filed: Apr. 5, 1983

[30] Foreign Application Priority Data

Apr. 28, 1982 [GB] United Kingdom ............... 8212254

[51] Int. Cl.$^3$ ............................................. G02B 5/14
[52] U.S. Cl. ............................. 350/96.32; 350/96.1; 350/96.15
[58] Field of Search .............. 350/96.15, 96.20, 96.29, 350/96.30, 96.32, 96.1

[56] References Cited

U.S. PATENT DOCUMENTS

| | | | |
|---|---|---|---|
| 4,109,997 | 8/1978 | Iverson | 350/96.15 X |
| 4,259,584 | 3/1981 | Krumme | 250/368 |
| 4,277,134 | 7/1981 | Upton, Jr. | 350/96.20 |
| 4,278,323 | 7/1981 | Waldman | 350/96.20 |
| 4,401,360 | 8/1983 | Streckmann et al. | 350/96.15 |
| 4,436,367 | 3/1984 | Lewis et al. | 350/96.20 |
| 4,447,114 | 5/1984 | Koene | 350/96.20 |
| 4,456,903 | 6/1984 | Kishi et al. | 350/96.20 X |
| 4,460,242 | 7/1984 | Birch et al. | 350/96.20 |
| 4,466,695 | 8/1984 | Kruger | 350/96.20 |

FOREIGN PATENT DOCUMENTS 1528251  11/1978  United Kingdom ............. 350/96.15

OTHER PUBLICATIONS

*Photonics Spectra*, Feb. 1982, "Rotary Joints: Fiber Optics' Slip Rings", pp. 41–42, Lewis et al.
*Eureka*, Jun. 1981, "Optical Fibres Outperform Slip Rings", p. 47.

Primary Examiner—William L. Sikes
Assistant Examiner—Frank González
Attorney, Agent, or Firm—Mason, Fenwick & Lawrence

[57]  ABSTRACT

An optical slip ring comprises a housing made of low refractive index material which defines a hollow toroid (10) and a pair of passageways (15A, 15B) leading from the toroid (10). One passageway (15B) leaves the toroid (10) steplessly in a clockwise direction and passageway (15A) leaves the toroid (10) steplessly in an anti (counter-)clockwise direction. The toroid (10) and the passageways (15A, 15B) are filled with high refractive index fluid. The housing is formed in two portions which are mounted for relative rotation about an axis (13) perpendicular to the toroidal equatorial plane (12) and coincident with the center (14) of the toroid, each portion having an interface lying on a surface of revolution (which may be the toroidal equatorial plane (12)) generated about the axis (13), one housing portion incorporating one passageway (15A) and the other housing portion incorporating the other passageway (15B).

9 Claims, 5 Drawing Figures

U.S. Patent  May 28, 1985  4,519,673
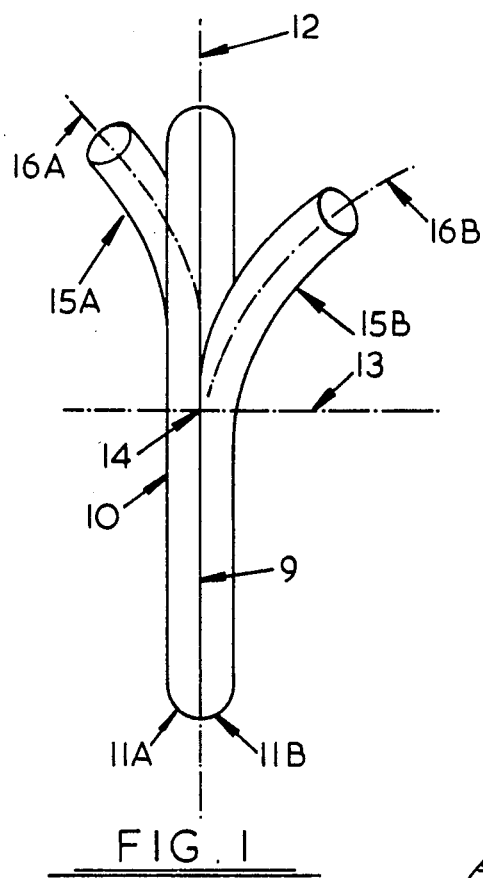
FIG. 1
FIG. 4
FIG. 2
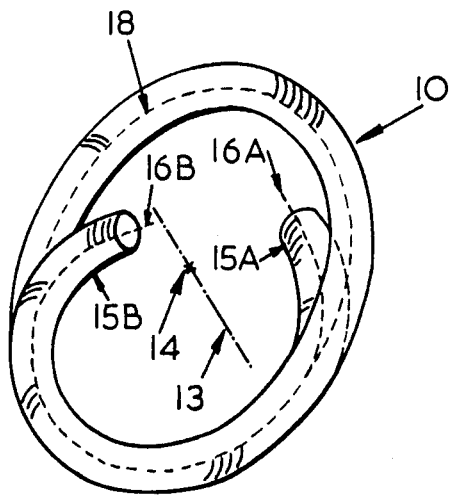
FIG. 3
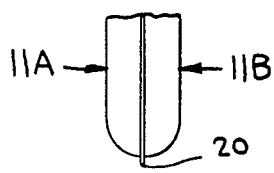
FIG 5

OPTICAL WAVEGUIDE SLIP RING ASSEMBLY

BACKGROUND OF THE INVENTION

This invention relates to optical communications and in particular to an assembly for maintaining optical communication between relatively movable members.

Many optical communications systems are nowadays used instead of conventional electrical communications systems in order to render the system immune from electromagnetic interference and at the same time to take advantage of the high bandwidth capabilities of optical signalling. Many applications require data to be transferred from a rotating to a stationary member (or vice versa) and whereas in conventional electrical systems this is accomplished by way of a slip-ring assembly which is relatively simple in construction known forms of the equivalent optical assembly are much more complicated. These known optical assemblies are described (for example) in U.K. patent specifications Nos. 1528251 and 2037979A and also in the Journals "Eureka" (June 1981 p. 47) and "Photonics Spectra" (February 1982, p. 41).

It is an object of the present invention to provide an improved form of assembly for maintaining optical communication between relatively movable members.

According to the present invention there is provided an assembly for maintaining optical communications between relatively movable members, comprising a housing mode of a low refractive index material and defining a hollow toroid shaped chamber and first and second passageways leading from said hollow toroid shaped chamber such that there is substantially stepless transition from said toroid shaped chamber in a clockwise direction into the first passageway and from the toroid shaped chamber in a counter-clockwise direction into the second passageway, said passageways and toroid shaped chamber being filled with a fluid of high refractive index whereby said assembly forms a light guide, wherein said housing is formed in two portions mounted for relative rotation about an axis perpendicular to the toroidal equatorial plane and coincident with the centre of the toroid shaped chamber, said portions having an interface lying on a surface of revolution generated about said axis, one portion incorporating said first passageway and the other portion incorporating said second passageway.

It will be understood that each passageway functions as a connector for receiving a fibre light guide and, in use, one housing portion is rigidly connected to one movable member with a fibre light guide extending therebetween whilst the other housing portion is rigidly connected to the other movable member with a fibre light guide extending therebetween so that relative rotation of said members effects relative rotation of said housing portions, the rotational axes being arranged appropriately.

Conveniently the bore of said passageways is the same as that of said toroid shaped chamber and the angle of inclination between the toroidal longitudinal axis and the longitudinal axes of said passageways, at least at that portion thereof adjusting the toroid, is as small as possible. With this arrangement the coupling losses between the toroid and the passageways is minimised and where the overall diameter of the toroid is substantially greater than the diameter of the fibre light guides connected to the passageways the loss between light fed to the assembly through one passageway and extracted from the assembly through the other passageway can be as little as 3 dB.

Conveniently said housing material is mouldable and both housing portions (and pertaining passageway) are identical geometrically so that only a single mould is required to produce two housing portions which can be arranged to form said assembly. It will be appreciated that with this arrangement the surface of revolution requires to be coincident with the toroidal equatorial plane.

Conveniently said passageways have bores of circular cross-section. This cross-section may be constant throughout the length of the passageway but alternatively the bores may be tapered such that the circular cross-section diminishes or increases towards the toroid.

Preferably said passageway terminates at its end remote from the toroid with an internal shoulder to form a seat for the optical fibre to be fitted thereto whereby coupling loss between the passageway and the fibre can be minimised.

In order to provide a fluid seal at the interface between the housing portions a lip seal may be provided on one portion or each portion may be provided with flanges on the surface of revolution such flanges being provided with mating circular grooves and recesses forming a rubbing seal for containment of fluid within the housing but since such an arrangement is extremely difficult to manufacture to the high degree of accuracy required to avoid optical degradation of the assembly it is preferred, in order to effect the same result, to accommodate the entire assembly in a canister containing the same fluid as is within the toroid (or a fluid compatible therewith). The fluid outside the assembly may be pressurised, for example, by gravity.

By way of example the housing may be made of an acrylic plastics material and the fluid may be a polyphenyl ether such as SANTOVAC 5 (made by Monsanto Chemicals, Inc.).

BRIEF DESCRIPTION OF THE FIGURES

An embodiment of the present invention will now be described by way of example with reference to the accompanying schematic drawings, in which:

FIG. 1 is an end view of the assembly;

FIG. 2 is a sectional view of a detail;

FIG. 3 is a perspective view of the assembly;

FIG. 4 is a view of a further detail; and

FIG. 5 is a fragmentary detail view showing part of the housing portions and the location of the rubbing seal.

DETAILED DESCRIPTION OF A PREFERRED EMBODIMENT

In the drawings, which are purely schematic in form, the assembly is shown in FIG. 1 as comprising a toroid 10 which, as illustrated in FIG. 2, is hollow and of circular cross-section. Toroid 10 is formed in two halves 11A, 11B which have an interface 9 lying on the equatorial plane 12 of the toroid such that the two halves are relatively rotatable about axis 13 which extends perpendicularly to plane 12 and through the centre 14 of the toroid 10.

The toroidal half 11A communicates with a passageway 15A whilst toroidal half 11B communicates with a passageway 15B, these two passageways extending in opposite directions from the toroid 10 away from equatorial plane 12. The longitudinal axis 16A of passageway 15A makes a small acute angle with the longitudinal axis 18 of the toroid 10 and likewise longitudinal axis 16B of passageway 15B makes the same small acute angle with the longitudinal axis 18 of the toroid 10. It will be noted from FIG. 3 that within hollow toroid 10 passageway 15B emerges after a clockwise circuit of the toroid 10 whereas passageway 15A emerges after an anti or counter-clockwise circuit of the toroid 10 but in each instance the transition from toroid to passageway is smooth and substantially stepless, i.e. the passageways 15A, 15B merge into the toroid 10.

The free end of passageway 15A is shown in FIG. 4 and as indicated it is internally provided with a shoulder 19A to act as a stop for a fibre light guide to be connected thereto, the bore of shoulder 19A preferably being the same as the diameter of the fibre core to avoid coupling losses.

The hollow interior of the toroid 10 and the passageways 15A, 15B is totally filled with a fluid, preferably a liquid, of high refractive index and the toroid and passageways are defined by a housing made of a material of low refractive index so that the completed assembly functions as a light guide with light coupled into the assembly through one passageway being emitted from the other passageway after one or more circuits or part circuits within the toroid.

It will be appreciated that the assembly of the present invention permits single channel communication but a plurality of such assemblies could be mounted coaxially on a single shaft centred on axis 13 if multichannel communication were required and of course each channel could be duplex and/or multiplex.

It will also be appreciated that by virtue of item 10 being a 'toroid' as distinct from any other geometrical shape longitudinal axis 18 is circular but the cross-sectional shape of the bore of toroid 10 need not be circular although the circular cross-sectional shape is preferred. Furthermore the interface between the two housing portions or toroidal portions need not lie on the equatorial plane 12 since this is only one possible surface of revolution about axis 13. The surface of revolution could in fact define a cone having its apex on axis 13 and it will be observed that in this more general case the passageways 15A, 15B require to communicate with a respective toroidal portion and will extend in opposite directions away from the surface of revolution.

FIG. 5 illustrates a detail showing housing portions 11A, 11B provided with flanges on the surface of revolution (plane 12), such flanges being provided with mating circular grooves and recesses and forming a rubbing seal 20 for containment of fluid within the housing.

What is claimed is:

1. An assembly for maintaining optical communication between relatively movable members, comprising a housing made of a low refractive index material and defining a chamber in the form of a hollow toroid, and first and second passageways leading from said toroid-shaped chamber such that there is substantially stepless transition from said toroid-shaped chamber in a clockwise direction into the first passageway and from the toroid-shaped chamber in a counter-clockwise direction into the second passageway, said passageways and toroid-shaped chamber being filled with a fluid of high refractive index whereby said assembly forms a light guide,
wherein said housing is formed in two portions mounted for relative rotation about an axis perpendicular to the equatorial plane of the toroid-shaped chamber and coincident with the centre of the toroid-shaped chamber, said portions having an interface lying on a surface of revolution generated about said axis, one portion incorporating said first passageway and the other portion incorporating said second passageway.

2. An assembly as claimed in claim 1, wherein said surface of revolution is coincident with said equatorial plane.

3. An assembly as claimed in claim 1, wherein the bore of said passageways is the same as that of said toroid-shaped chamber.

4. An assembly as claimed in claim 3, wherein the overall diameter of the toroid-shaped chamber is substantially greater than the bore of said passageways.

5. An assembly as claimed in claim 4, wherein the bores of said passageways and that of said toroid-shaped chamber are each circular in cross-section.

6. An assembly as claimed in claim 1, wherein at said interface each housing portion has a flange which flanges define a rubbing seal extending along said surface of revolution for containment of said fluid within said housing.

7. An assembly as claimed in claim 1, wherein said housing is located within a canister holding a pressurised body of said fluid outside said housing for containment of said fluid within said housing.

8. An assembly as claimed in claim 6, wherein said housing is made of acrylic plastics material.

9. An assembly as claimed in claim 8, wherein said fluid is SANTOVAC 5.

* * * * *